Figure 1:
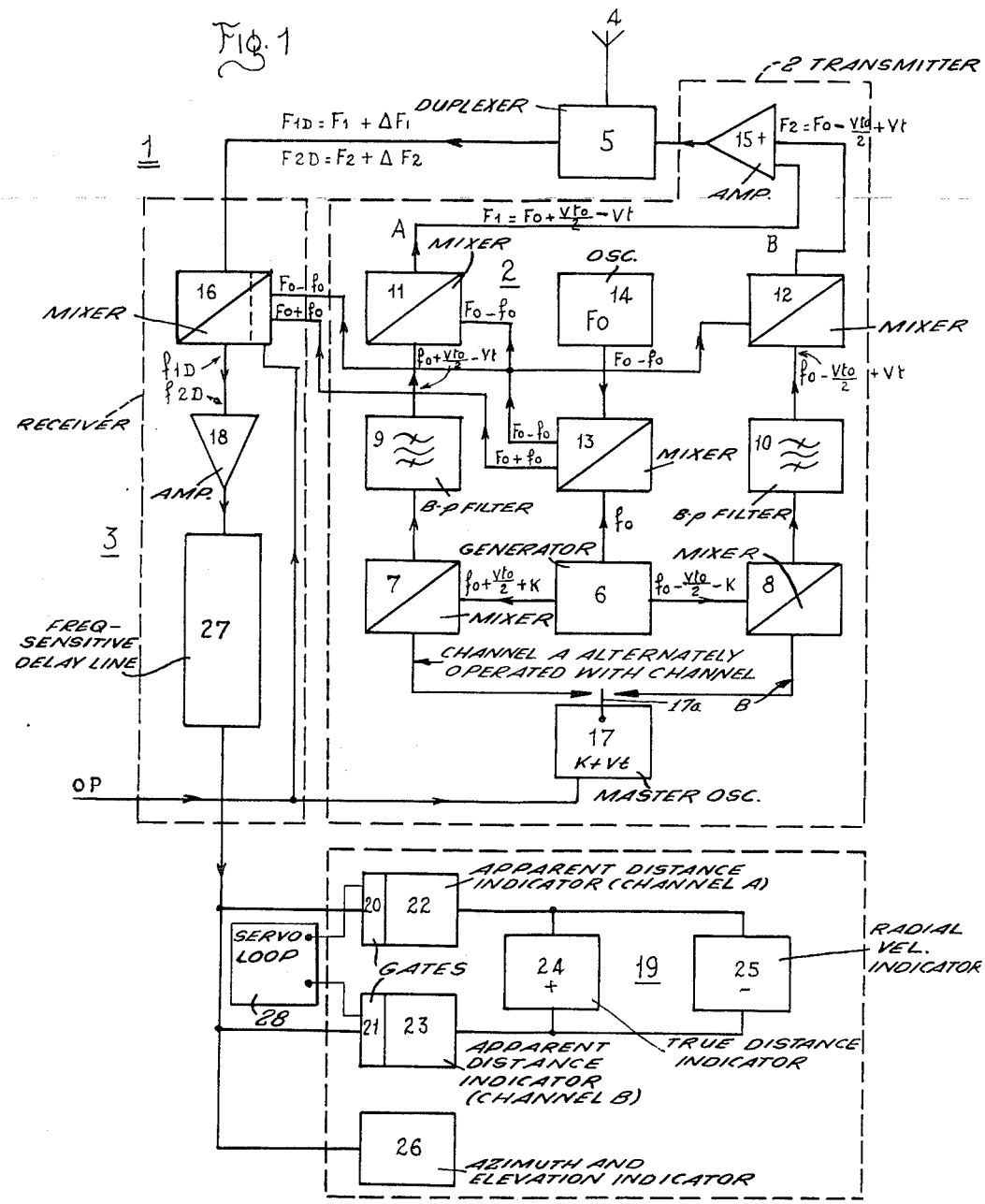

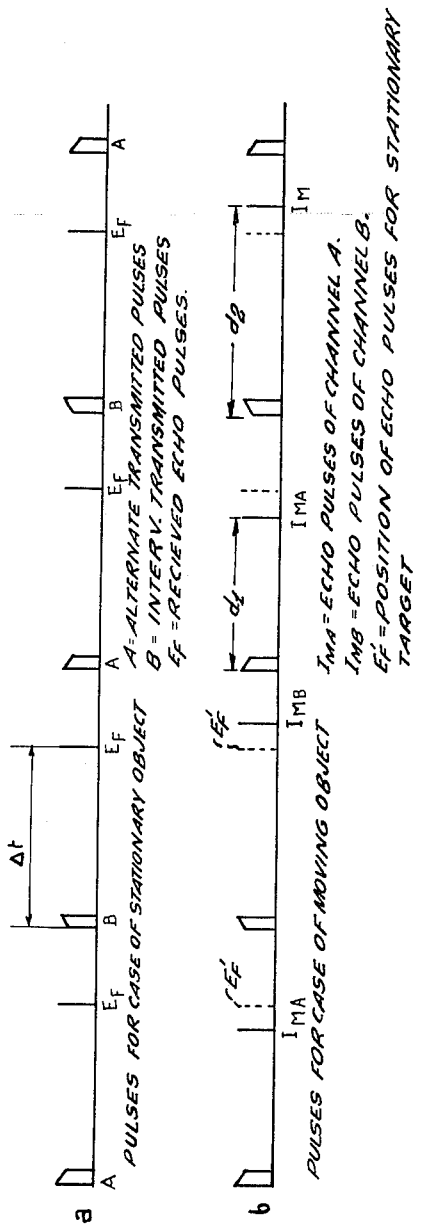

United States Patent Office 3,222,674
Patented Dec. 7, 1965

3,222,674
RADIO DETECTION AND AUTOMATIC
TRACKING EQUIPMENT
Jean Villepelet, Paris, France, assignor to Compagnie
Francaise Thomson-Houston, Paris, France, a French
body corporate
Filed Mar. 27, 1962, Ser. No. 182,812
Claims priority, application France, Apr. 11, 1961,
858,354
2 Claims. (Cl. 343—9)

This invention relates to radio-detection and automatic tracking methods which utilize the Doppler effect, and to equipment making application thereof.

This radio detection method enables echoes reflected by stationary obstacles to be effectively eliminated. It is furthermore able to furnish accurate information relating to the radial displacement velocity of the targets located. This velocity is proportional to the shift in frequency due to the Doppler effect between the carrier frequency of the echoes reflected by the target and the carrier frequency of the pulses transmitted. In accordance with a known method, this frequency shift is measured by means of a frequency discriminator which is part of a servo loop which automatically maintains the frequency of a slaved oscillator equal to the frequency shift referred to. Since this frequency is relatively low, it becomes a notably delicate task to develop a receiver comprising such a device. The difficulty is still further increased when it is desired to locate objects travelling at very high speed (say 4 km./sec.), at very great distances, since the receiver must then comprise a plurality of servo loops similar to that referred to precedingly. In addition, long pulses must then be transmitted in order to radiate enough power to provide a satisfactory range. This in turn leads to resorting to the so-called pulse compression technique.

The improvements according to this invention are easy to carry into practice since they allow a receiver of simple design to be used. Their originality resides in the simultaneous utilization of the Doppler effect and the so-called pulse compression technique.

The improved radio detection method according to this invention consists in linearly modulating the carrier frequency of the transmitted pulses. But whereas the mean value of this carrier frequency is constant from one pulse to the next, the time-proportional coefficients of the carrier frequencies of two pulses emitted in succession are opposite numbers ($\alpha$ and $-\alpha$).

The carrier frequencies of two pulses emitted in succession and reflected by the same object are equally influenced by the Doppler effect.

The two types of echo pulses reflected by the objects located are intercepted by the receiving antenna and respectively sustain two frequency changes which are effected by means of two sinusoidal voltages of different frequencies. These frequencies are determined in such manner that the intermediate frequencies be affected in opposite senses by the Doppler effect and the mean values of these frequencies be equal for both types of pulses.

After this frequency change and a possible amplification, the echo pulses are applied to a line introducing a delay which is a function of the frequency, said delay being determined in such manner as to obtain a pulse compression effect. This being so, the pulses will be delayed differently by the delay line, and from the difference between the delays of two successive pulses it is easy to deduce the velocity of the moving object. Indeed the use of servo loops makes it possible to measure the positions of these pulses at the time of their transmission and to compute both the distance and the velocity of the object. The distance of the object will be proportional to the mean position of two successive pulses, but its velocity will be proportional to the difference between the actual shift sustained by the pulses as they issue from the delay line and the shift they would have sustained had the moving object been stationary.

The following description given by way of example only and not of limitation, with reference to the single accompanying drawing, will give a clear understanding of the technical features of the radio-detection method according to this invention.

Referring to the drawing filed herewith:

FIGURE 1 is a block diagram of a radio-detection apparatus for performing the method according to the invention; and FIGURE 2, which is a diagram of the pulses transmitted and received by the apparatus in FIGURE 1, is intended to better explain the manner of operation of the said apparatus.

Referring now to FIGURE 1, the radio detection apparatus 1 comprises a transmitter 2 and a receiver 3 which are connected to an antenna 4 through a duplexer 5.

During each operative period, the transmitter produces a pulse the carrier frequency of which varies linearly. The law of variation of this frequency, however, is not the same for two successive pulses. The instantaneous frequencies of the waves emitted for two successive pulses have opposed time-proportional coefficients. Whereas for one operative period the transmitter frequency is $F_0 + Vt$, during the next period it will be $F_0' - Vt$, where $F_0$ and $F_0'$ are determined to ensure a constant average carrier frequency.

The transmitter comprises a generator 6 producing two high frequency voltages $$f_0 + \frac{Vt_0}{2} + K$$

and $$f_0 - \left(\frac{Vt_0}{2} + K\right)$$

where $t_0$ is the duration of each transmitted pulse. These voltages are respectively applied to mixers 7, 8, which mixers likewise receive the voltage produced by a driving oscillator 17 of low frequency $K + Vt$.

Whereas the voltage issuing from mixer 7 has a frequency $$f_0 + \frac{Vt_0}{2} - Vt$$

the voltage issuing from mixer 8 has a frequency $$f_0 - \frac{Vt_0}{2} + Vt$$

These two voltages are respectively applied to band-pass filters 9 and 10 the central frequency of which is $f_0$.

The voltages issuing from the filters 9 and 10 each sustain a transposition in the mixers 11 and 12, and to the second input of each of these mixers 11 and 12 is applied a very high frequency or ultra-high frequency voltage $F_0 - f_0$ produced by an auxiliary mixer 13. It should be noted that in this device, the voltage of frequency $f_0$, which is also produced by the generator 6, is mixed with the voltage of frequency $F_0$ produced by the oscillator 14, the said device furnishing two voltages of frequency $F_0 - f_0$ and $F_0 + f_0$, the voltage having the latter frequency being used in the receiver 3, as will be more explicitly described hereinafter.

The mixers 11 and 12 respectively produce voltages of frequency $$F_0 + \frac{Vt_0}{2} - Vt$$

and $$F_0 - \frac{Vt_0}{2} + Vt$$

which are applied to a summer-amplifier 15 which is connected to the duplexer 5. In what follows, the assembly comprising the devices 7, 9, 11 associated to the transmitter will be termed "channel A," and the assembly comprising the devices 8, 10, 12 "channel B."

The master oscillator (not shown) of the radio detection apparatus 1 triggers operation of the driving oscillator 17 at each transmission period over the connection OP. The said driving oscillator comprises an auxiliary device which, as represented at 17a, alternately switches, to the mixers 7 and 8, the voltage of frequency $K+Vt$ which is produced by oscillator 17, as a result of which the channels A and B comprised in the transmitter are rendered operative in turn in the course of two successive transmission periods.

The transmitter 2 of apparatus 1 alternately produces pulse-modulated waves the carrier frequencies of which vary as $$F_1 = F_0 + \frac{Vt_0}{2} - Vt \quad (1)$$

and $$F_2 = F_0 - \frac{Vt_0}{2} + Vt \quad (2)$$

The located target or other moving body reflects these waves and the carrier frequency $F_{1D}$ and $F_{2D}$ of the echo pulses received by the antenna 4 are affected by the Doppler effect.

Whence:

$$F_{1D} = F_1 + \Delta F_1 \quad (3)$$
$$F_{2D} = F_2 + \Delta F_2 \quad (4)$$

It should be noted that in expressions (1) and (2), the term $F_0$ is preponderant, so that $\Delta F_1$ differs little from $\Delta F_2$. It is therefore possible to write $\Delta F_1 \simeq \Delta F_2 = \Delta F_0$. The pulses received by the antenna are transmitted by the duplexer 5 to the mixer 16 and the receiver 3. The mixer 16 consequently receives, alternatively (depending on the particular operative period of the apparatus), pulses the carrier frequencies of which are $F_{1D}$ and $F_{2D}$. These pulses are respectively mixed therein with voltages of frequency $(F_0+f_0)$ and $(F_0-f_0)$, these voltages being produced by the transmitter auxiliary mixer 13. The alternately produced voltages have intermediate frequencies $$f_{1D} = F_0 + f_0 - F_{1D} = f_0 - \frac{Vt_0}{2} + Vt - \Delta F_0$$

and $$f_{2D} = F_{2D} - (F_0 - f_0) = f_0 - \frac{Vt_0}{2} + Vt + \Delta F_0$$

The voltage pulses produced by the mixer 16 are transmitted to the frequency-sensitive delay line 27 by the amplifier 18.

Applying the well known so-called pulse compression technique, use is made of a frequency-sensitive delay line 27 which transmits the signals applied thereto at a speed which varies as a function of their frequency. The law $\tau = \tau_0 + \alpha f$, giving the variation of the transmitting time as a function of the frequency $f$, is determined in the classic manner in accordance with the law of modulation of the carrier frequency of the signals transmitted, with a view to obtaining a maximum compression effect. As is well known, if V be the coefficient of augmentation of the frequency $f$ as a function of time, then $(f = A + Vt)$ the coefficient of augmentation $\alpha$ of the delay $\tau$ as a function of the frequency must be $$\alpha = -\frac{1}{V}$$

The pulses transmitted and received by the apparatus in FIGURE 1 in the course of several operative periods are represented along the lines $a$ and $b$ in FIGURE 2, using a common time scale. The pulses on line $a$ represents the case of a stationary obstacle and the pulse on line $b$ represents the case of a moving obstacle. In the diagram, the true saw-tooth shape of the transmitted pulses is used to illustrate the variation in frequency with time, whereas for purposes of simplification the echo pulses are represented schematically by a single vertical line corresponding to the centre of the actual pulses.

When the antenna 4 receives echo pulses reflected off a stationary obstacle, pulses $E_F$ (line $a$) issuing from the delay line 27 have identical positions with reference to the start of each operative period of the apparatus. In other words, the time interval $\Delta t$ elapsing between the start of such a period and the return of an echo pulse is independent of the shape of the pulse at transmission, and therefore independent of the channel from which it issues. The time interval $\Delta t$ between the initial instant $t_0$ of the operative period and the initial instant $t$ of the receipt of the echo pulse provides a measure of the distance D between the antenna and the stationary object.

When the antenna 4 receives pulses reflected by a moving obstacle, a pulse $I_{MA}$ (or $I_{MB}$, line $b$) issues from the delay line 27 in the course of succesisve operative periods of the apparatus.

The positions of the echo pulses will vary from one operative period to the next, on account of the shape (or frequency variation) of the transmitted pulses, the Doppler effect, and the properties of the delay line 27. If the moving obstacle is at a distance D, the pulses will lag or lead with respect to the echo pulses $E_F$ (the shift intervals being equal), accordingly as the said pulses have been transmitted by channel A or channel B. The positions of the pulses $I_{MA}$ and $I_{MB}$ would provide a measure of the apparent distances $d_1$ and $d_2$ between the antenna and the obstacle, depending on which transmission channel is operative. The average of these distances will be equal to the true antenna-to-obstacle distance. The difference between these distances, which is proportional to the shift due to the Doppler effect between the frequencies of the transmitted pulses and those of the echo pulses, will also be proportional to the velocity of the moving body.

Each pulse transmitted by the line 27 is applied to a system of circuits 19 adapted to determine both the co-ordinates and the velocity of the objects located. The said pulse is applied to a gating circuit 20 which is automatically ungated by a servo loop 28 when the pulse is a pulse transmitted through the transmitter channel A and reflected by the object being tracked. Each such pulse is likewise applied to a gating circuit 21 which operates in similar fashion with respect to the pulses transmitted through channel B. Each pulse issuing from the gating circuit 20 is applied to a device 22 which measures the apparent antenna-to-target distance $d_1$ when said target reflects the pulses transmitted over channel A.

It will be remembered that the apparent distance $d_1$ differs from the true distance on account of the Doppler effect and the properties of the line 27. Each pulse issuing from the gating circuit 21 is applied to a device 23 for measuring the apparent antenna-to-target distance $d_2$ when the said target reflects the pulses transmitted over channel B. It will be manifest that the distance $d_2$ will differ from the true antenna-to-target distance for the reasons already set forth in regard to $d_1$. The signals produced by the circuits 22 and 23 and relating to measurement of the distances $d_1$ and $d_2$ are applied to the inputs of a summator 24 and to the inputs of a substractor 25. The summator 24 produces a signal which is proportional to the mean $$\frac{d_1+d_2}{2}$$

of the apparent antenna-to-target distances, and this quantity will be proportional to the true antenna-to-target distance. The substractor 25 produces a signal proportional to the velocity of the target.

Lastly, the pulses transmitted by the line 27 are further applied to a device 26 which determines the target elevation and azimuth.

What I claim is:

1. A pulse radio detection and automatic tracking equipment comprising a transmitter for transmitting carrier wave pulses in a periodic succession, said pulses being frequency modulated in the positive sense throughout the duration of each pulse for alternate pulses and in the negative sense throughout the duration of each intervening pulse, a receiver for receiving echo pulses returned from distant objects and having two receiving channels, each channel including a mixer for combining received echo pulse with locally generated pulses to generate intermediate frequency echo pulses, means rendering said receiving channels alternately operative so that one channel receives echo pulses from alternate transmitted pulses and the other receiving channel receives echo pulses from the intervening transmitted pulses, and a frequency-sensitive delay line connected to the output of said receiving channels for transmitting said intermediate frequency echo pulses along said line at different velocities determined by the respective frequencies of the intermediate frequency echo pulses, whereby said intermediate frequency echo pulses are delivered at the output of said delay line in time spaced positions determined by the frequencies of said intermediate frequency echo pulses.

2. A pulse radio detection and automatic tracking equipment comprising a transmitter for transmitting carrier wave pulses in a periodic succession, said pulses being frequency modulated in the positive sense throughout the duration of each pulse for alternate pulses and in the negative sense throughout the duration of each intervening pulse, said transmitter including two separate transmitting channels, one for transmitting the pulses modulated in the positive sense and the second for transmitting the pulses modulated in the negative sense, means to radiate said pulses and to receive the echo pulses back from a moving target, mixing circuits combining said echo pulses with locally generated pulses of different frequencies during successive periods and producing pulses of intermediate frequencies which are affected in opposite senses by the Doppler effect, a frequency-sensitive delay device controlled by the intermediate frequency echo pulses and transmitting them at a velocity varying in accordance with their respective frequencies, said intermediate frequency echo pulses being delivered by said delay device so that their respective time positions give a value of the apparent distance of the target, said positions being different according to the particular transmitting channel in operation, means controlled by said delivered pulses for deriving the half-sum of said apparent distances to indicate the true distance of the target, and means controlled by said delivered pulses for deriving the difference between said apparent distances, said difference being proportional to the frequency shift due to the Doppler effect and giving a measurement of the radial velocity of said target.

References Cited by the Examiner

UNITED STATES PATENTS 2,525,328   10/1950   Wolff _____ 343—17.2
3,065,465   11/1962   Wimberly _____ 343—17.2

KATHLEEN CLAFFY, *Primary Examiner.*

CHESTER L. JUSTUS, *Examiner.*